(12) United States Patent
Masuda et al.

(10) Patent No.: US 11,627,295 B2
(45) Date of Patent: *Apr. 11, 2023

(54) IMAGE PROCESSING DEVICE, PROJECTION SYSTEM, IMAGE PROCESSING METHOD, AND IMAGE PROCESSING PROGRAM

(71) Applicant: FUJIFILM Corporation, Tokyo (JP)

(72) Inventors: Tomonori Masuda, Saitama (JP); Akihiro Ishizuka, Saitama (JP); Kazuki Inoue, Saitama (JP); Kazuki Ishida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/884,101

(22) Filed: Aug. 9, 2022

(65) Prior Publication Data
US 2022/0385869 A1     Dec. 1, 2022

Related U.S. Application Data

(63) Continuation of application No. 17/471,793, filed on Sep. 10, 2021, now Pat. No. 11,477,422, which is a
(Continued)

(30) Foreign Application Priority Data

Mar. 29, 2019   (JP) .............................. JP2019-068601

(51) Int. Cl.
*H04N 9/31*     (2006.01)
*G06T 5/00*     (2006.01)

(52) U.S. Cl.
CPC ........... *H04N 9/3185* (2013.01); *G06T 5/002* (2013.01); *H04N 9/317* (2013.01); *H04N 9/3147* (2013.01)

(58) Field of Classification Search
CPC .. H04N 9/3147; H04N 9/3185; H04N 9/3182; H04N 9/31; H04N 9/317; H04N 9/3179; G06T 5/002
(Continued)

(56) References Cited

U.S. PATENT DOCUMENTS 6,570,623 B1     5/2003  Li et al.
7,292,207 B1    11/2007  Naegle et al.
(Continued)

FOREIGN PATENT DOCUMENTS

JP     2007-264394 A    10/2007
JP     2006-165949 A     6/2008
(Continued)

OTHER PUBLICATIONS

Japanese Office Action for Japanese Application No. 2021-511169, dated Aug. 23, 2022, with English translation.
(Continued)

*Primary Examiner* — Sherrie Hsia
(74) *Attorney, Agent, or Firm* — Birch, Stewart, Kolasch & Birch, LLP

(57) ABSTRACT

An image processing device includes: an image acquisition unit that acquires first and second image data for projecting the image from the first and second projection units respectively; a superimposed region information acquisition unit that acquires information on a superimposed region between the projection range of the first projection unit and the projection range of the second projection unit; a first image processing unit that performs first image processing on a first portion in the first image data corresponding to the superimposed region; a second image processing unit that performs second image processing on a second portion in the second image data corresponding to the superimposed region; and an output unit that outputs the first image data
(Continued)

after the first image processing as image data for the first projection unit and outputs the second image data after the second image processing as image data for the second projection unit.

16 Claims, 11 Drawing Sheets

Related U.S. Application Data continuation of application No. PCT/JP2020/004665, filed on Feb. 6, 2020.

(58) Field of Classification Search
USPC .... 348/744, 745, 747, 806, 807; 353/30, 48, 353/94
See application file for complete search history.

(56) References Cited

U.S. PATENT DOCUMENTS

| | | |
|---|---|---|
| 2009/0213337 A1 | 8/2009 | Kondo et al. |
| 2011/0242496 A1 | 10/2011 | Kimoto et al. |
| 2017/0214895 A1 | 7/2017 | Fujioka |
| 2018/0262728 A1 | 9/2018 | Kobayashi |

FOREIGN PATENT DOCUMENTS

| | | |
|---|---|---|
| JP | 2009-206665 A | 9/2009 |
| JP | 2009-260932 A | 11/2009 |
| JP | 2011-227468 A | 11/2011 |
| JP | 2012-68528 A | 4/2012 |
| JP | 2012-169735 A | 9/2012 |
| JP | 2013-153392 A | 8/2013 |
| JP | 2013-182061 A | 9/2013 |
| JP | 2015-145890 A | 8/2015 |
| JP | 2016-24296 A | 2/2016 |
| JP | 2017-129770 A | 7/2017 |
| JP | 2017-152784 A | 8/2017 |
| JP | 2018-125819 A | 8/2018 |
| JP | 2018-151442 A | 9/2018 |

OTHER PUBLICATIONS

International Preliminary Report on Patentability for International Application No. PCT/JP2020/004665, dated Dec. 16, 2020, with English translation.
International Search Report for International Application No. PCT/JP2020/004665, dated Apr. 21, 2020, with English translation.
Notice of Allowance dated Apr. 28, 2022 in corresponding U.S. Appl. No. 17/471,793.

IMAGE PROCESSING DEVICE, PROJECTION SYSTEM, IMAGE PROCESSING METHOD, AND IMAGE PROCESSING PROGRAM

CROSS REFERENCE TO RELATED APPLICATION

This application is a Continuation of U.S. patent application Ser. No. 17/471,793, filed on Sep. 10, 2021, which is a continuation of International Application No. PCT/JP2020/004665 filed on Feb. 6, 2020, and claims priority from Japanese Patent Application No. 2019-068601 filed on Mar. 29, 2019, the entire disclosures of which are incorporated herein by reference.

BACKGROUND OF THE INVENTION

1. Field of the Invention

The present invention relates to an image processing device, a projection system, an image processing method, and a computer readable medium storing an image processing program.

2. Description of the Related Art

A method is known in which one image is divided to generate a plurality of division images, and a plurality of projectors project the division images, respectively, to display one image on a large screen (for example, see JP2016-024296A and JP2017-129770A).

SUMMARY OF THE INVENTION

In a case in which the plurality of division images are projected and displayed on the large screen, the adjacent division images are partially overlapped. However, it is difficult to accurately perform registration of an overlapping portion of the two division images, and image bleeding occurs in the overlapping portion by an amount of a registration error. In particular, such bleeding is remarkable in a case in which a fine subject, such as a high-frequency pattern, is included in the overlapping portion. JP2016-024296A and JP2017-129770A do not disclose a method of suppressing the bleeding of an image.

The present invention has been made in view of the above circumstances, and is to provide an image processing device for a projection system, a projection system, an image processing method, and a non-transitory computer readable medium storing an image processing program which can suppress the bleeding in the overlapping region of the images to achieve a high image quality in a case in which the plurality of images are projected to display one image.

An aspect of the present invention relates to an image processing device for a projection system that projects an image from each of a first projection unit and a second projection unit in a state in which at least parts of projection ranges are overlapped, the device comprising an image acquisition unit that acquires first image data for projecting the image from the first projection unit and second image data for projecting the image from the second projection unit, a superimposed region information acquisition unit that acquires information on a superimposed region between the projection range of the first projection unit and the projection range of the second projection unit, a first image processing unit that performs first image processing on a first portion in the first image data, which corresponds to the superimposed region, a second image processing unit that performs second image processing on a second portion in the second image data, which corresponds to the superimposed region, and an output unit that outputs the first image data after the first image processing as image data for the first projection unit, and outputs the second image data after the second image processing as image data for the second projection unit.

Another aspect of the present invention relates to a projection system comprising the image processing device, the first projection unit, and the second projection unit.

Still another aspect of the present invention relates to an image processing method in a projection system that projects an image from each of a first projection unit and a second projection unit in a state in which at least parts of projection ranges are overlapped, the method comprising an image acquisition step of acquiring first image data for projecting the image from the first projection unit and second image data for projecting the image from the second projection unit, a superimposed region information acquisition step of acquiring information on a superimposed region between the projection range of the first projection unit and the projection range of the second projection unit, a first image processing step of performing first image processing on a first portion in the first image data, which corresponds to the superimposed region, a second image processing step of performing second image processing on a second portion in the second image data, which corresponds to the superimposed region, and an output step of outputting the first image data after the first image processing as image data for the first projection unit and outputting the second image data after the second image processing as image data for the second projection unit.

Still another aspect of the present invention relates to a non-transitory computer readable medium storing an image processing program in a projection system that projects an image from each of a first projection unit and a second projection unit in a state in which at least parts of projection ranges are overlapped, the program causing a computer to execute an image acquisition step of acquiring first image data for projecting the image from the first projection unit and acquiring second image data for projecting the image from the second projection unit, a superimposed region information acquisition step of acquiring information on a superimposed region between the projection range of the first projection unit and the projection range of the second projection unit, a first image processing step of performing first image processing on a first portion in the first image data, which corresponds to the superimposed region, a second image processing step of performing second image processing on a second portion in the second image data, which corresponds to the superimposed region, and an output step of outputting the first image data after the first image processing as image data for the first projection unit and outputting the second image data after the second image processing as image data for the second projection unit.

According to the present invention, it is possible to provide an image processing device for a projection system, a projection system, an image processing method, and an image processing program which can suppress the bleeding in the overlapping region of the images to achieve a high image quality in a case in which the plurality of images are projected to display one image.

DESCRIPTION OF THE PREFERRED EMBODIMENTS

Hereinafter, an embodiment of the present invention will be described with reference to the drawings.

Figure 1:
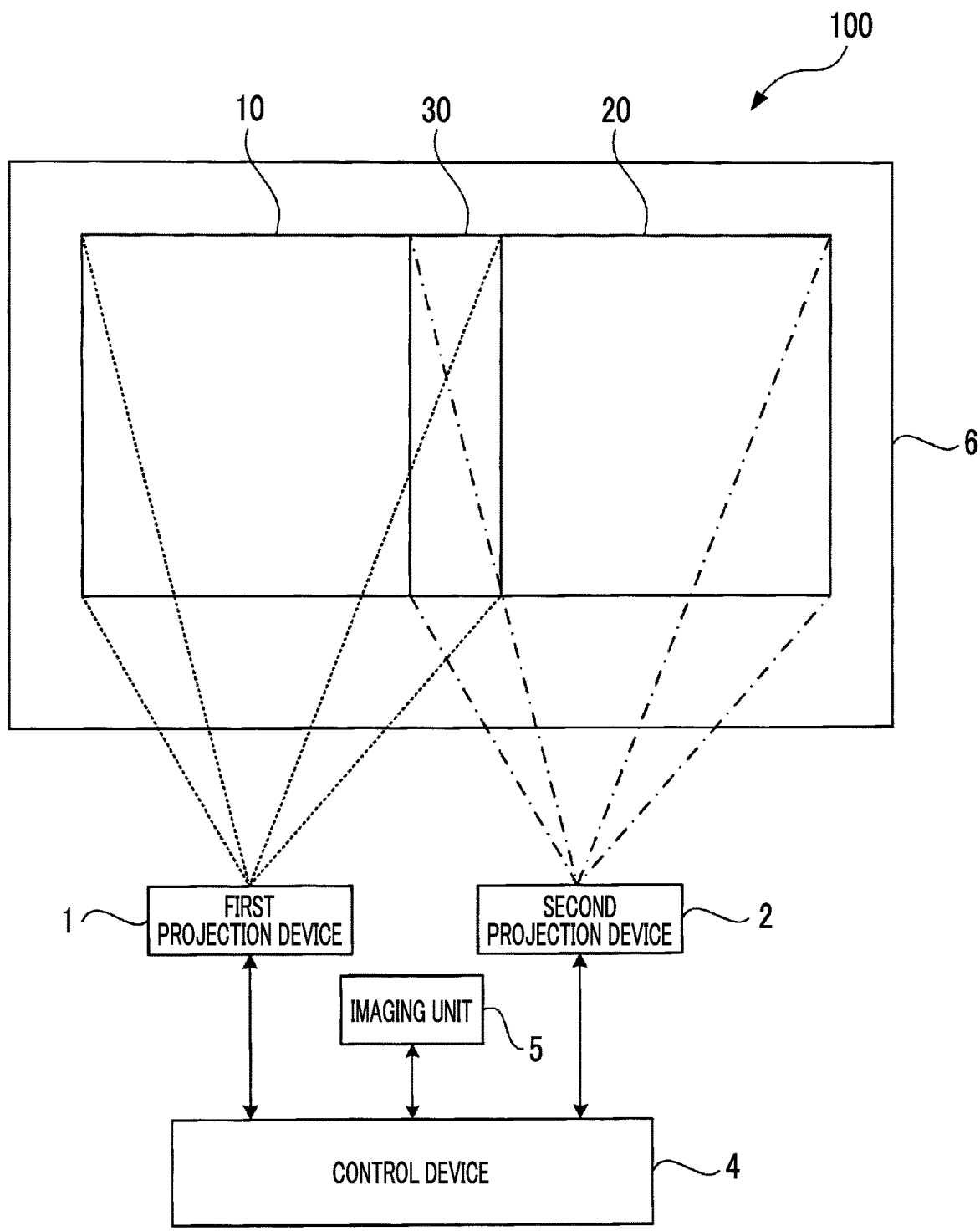
FIG. 1 is a schematic diagram showing a schematic configuration of a projection system 100, which is an embodiment of a projection system of the present invention.

FIG. 1 is a schematic diagram showing a schematic configuration of a projection system 100, which is the embodiment of a projection system of the present invention. The projection system 100 comprises a first projection device 1, a second projection device 2, a control device 4, an imaging unit 5, and a screen 6. The first projection device 1 and the second projection device 2 are configured by, for example, a liquid crystal projector, a digital light processing (DLP: registered trademark) projector, a liquid crystal on silicon (LCOS) projector, a grating light valve (GLV) projector, or the like.

The projection system 100 displays a horizontally long projection target image by projecting a first division image on a first projection range 10 of the screen 6 from the first projection device 1, projecting a second division image, from the second projection device 2, on a second projection range 20 of the screen 6 which is overlapped with a part (referred to as a superimposed region 30) of the first projection range 10, and joining these first division image and second division image.

The control device 4 is a device including a control unit including various processors, a communication interface (not shown) which communicates with each unit, and a storage medium (not shown) such as a hard disk, a solid state drive (SSD), or a read only memory (ROM), and controls the first projection device 1, the second projection device 2, and the imaging unit 5 in an integrated manner.

Examples of the various processors of the control unit of the control device 4 include a central processing unit (CPU), which is a general-purpose processor that executes a program and performs various processing, programmable logic device (PLD), which is a processor whose circuit configuration can be changed after manufacturing, such as field programmable gate array (FPGA), or a dedicated electric circuit, which is a processor having a circuit configuration specially designed for executing specific processing such as an application specific integrated circuit (ASIC), and the like. The structure of these various processors is, more specifically, an electric circuit in which circuit elements such as semiconductor elements are combined. The control unit of the control device 4 may be configured by one of the various processors, or may be configured by a combination of two or more processors of the same type or different types (for example, a combination of a plurality of the FPGAs or a combination of the CPU and the FPGA).

The imaging unit 5 comprises an imaging element such as a charged coupled device (CCD) type image sensor or a metal oxide semiconductor (MOS) type image sensor which images a subject through an imaging optical system, and images the screen 6. The captured image captured by the imaging unit 5 is input to the control device 4.

Figure 2:
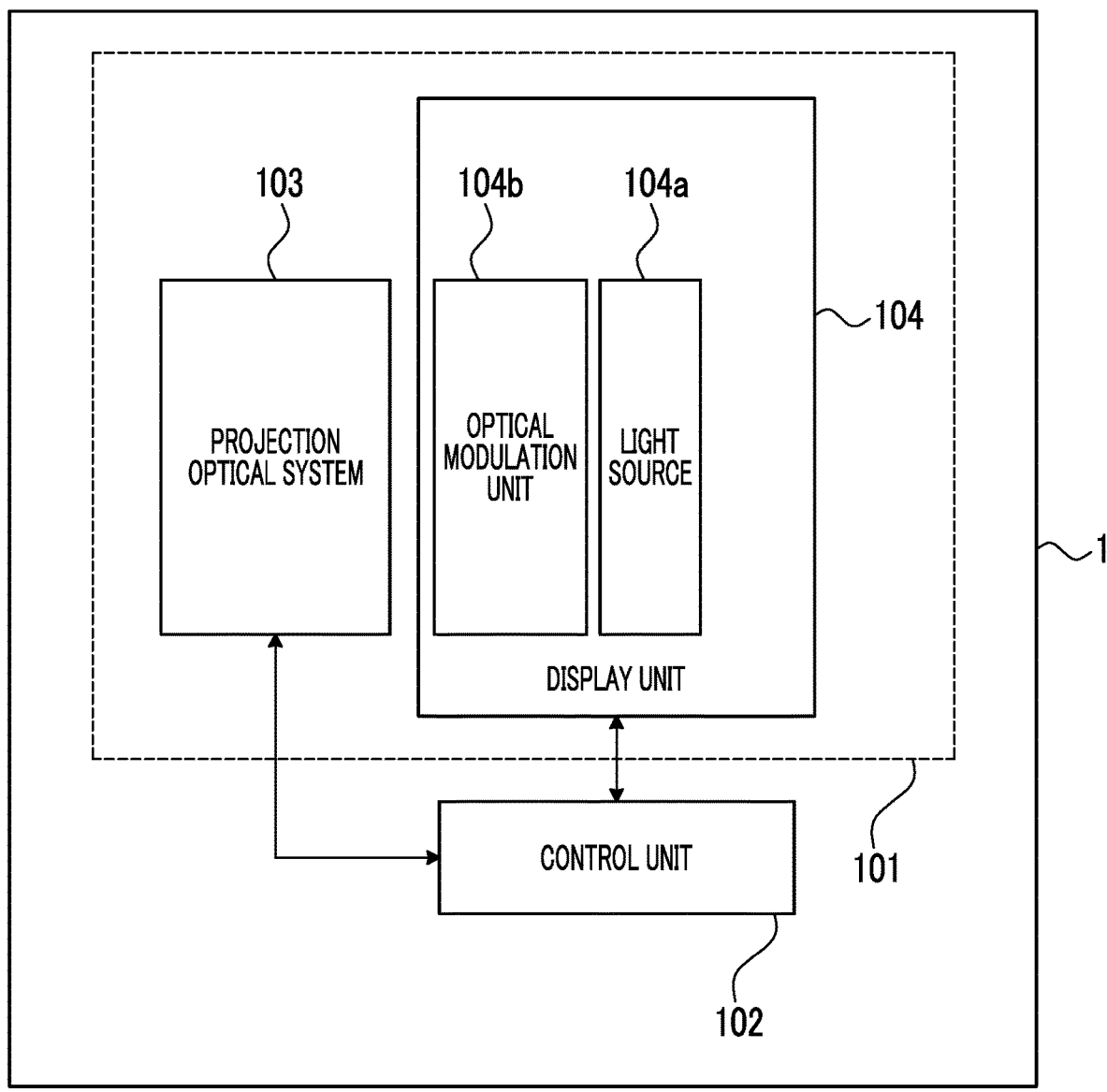
FIG. 2 is a schematic diagram showing an internal configuration of a first projection device 1 shown in FIG. 1.

FIG. 2 is a schematic diagram showing an internal configuration of the first projection device 1 shown in FIG. 1. Note that an internal configuration of the second projection device 2 shown in FIG. 1 is the same as that of the first projection device 1, and thus the description thereof will be omitted. The first projection device 1 comprises a projection unit 101 and a control unit 102.

The projection unit 101 comprises a display unit 104 including a light source 104a and an optical modulation unit 104b, and a projection optical system 103.

The light source 104a includes a light emitting element such as a laser or a light emitting diode (LED), and emits, for example, white light.

The optical modulation unit 104b is configured by, for example, three liquid crystal panels which spatially modulate, based on image information, each color light emitted from the light source 104a and separated into three colors of red, blue, and green by a color separation mechanism (not shown) to emit each color image. These three liquid crystal panels may be equipped with red, blue, and green filters, respectively, and modulate the white light emitted from the light source 104a by each liquid crystal panel to emit each color image. Further, as an element that spatially modulates each color light, a digital micromirror device (DMD), the LCOS, the GLV, or the like may be used.

The projection optical system 103 receives light from the display unit 104, and is configured by, for example, a relay optical system including at least one lens. The light passing through the projection optical system 103 is projected on the screen 6.

The control unit 102 controls the projection unit 101 based on image data input from the control device 4 to project an image based on the image data on the screen 6. First image data is input from the control device 4 to the control unit 102 of the first projection device 1, and the first division image based on the first image data is projected on the first projection range 10. Second image data is input from the control device 4 to the control unit 102 of the second projection device 2, and the second division image based on the second image data is projected on the second projection range 20.

Figure 3:
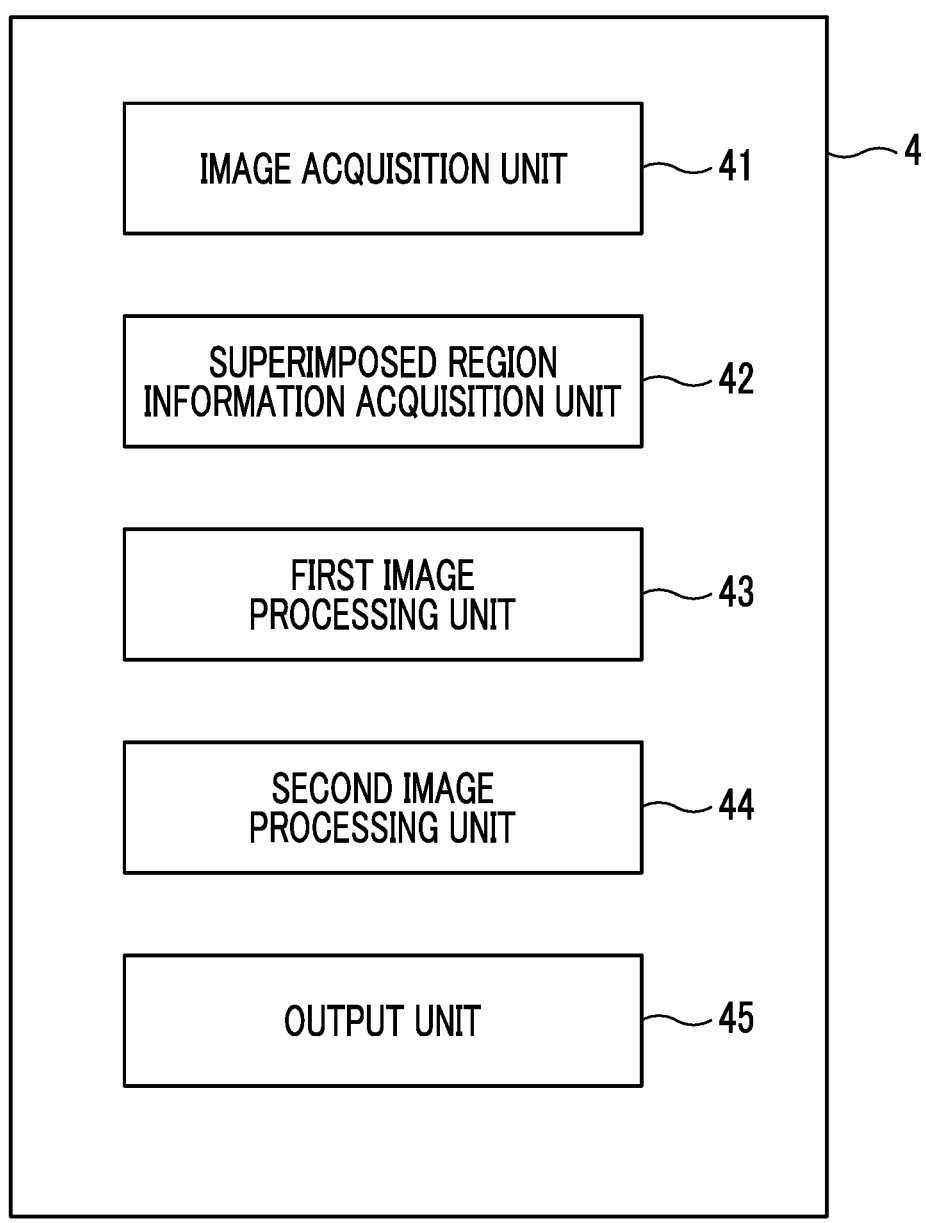
FIG. 3 is a functional block diagram of a control device 4 shown in FIG. 1.

FIG. 3 is a functional block diagram of the control device 4 shown in FIG. 1. The control unit of the control device 4 executes a program including an image processing program to functions as an image processing device including an image acquisition unit 41, a superimposed region information acquisition unit 42, a first image processing unit 43, a second image processing unit 44, and an output unit 45.

The image acquisition unit 41 acquires the first image data and the second image data by generating the first image data for projecting the first division image from the first projection device 1 and the second image data for projecting the second division image from the second projection device 2, from the data (hereinafter, also referred to as input image data) of the projection target image input from an external device such as a personal computer or the like. Specifically, the image acquisition unit 41 trims a portion in the input image data, which corresponds to the first projection range 10, to generate the first image data, and trims a portion in the input image data, which corresponds to the second projection range 20, to generate the second image data.

The first image data and the second image data may be generated by an external device and input to the control device 4 to be acquired by the image acquisition unit 41.

The superimposed region information acquisition unit 42 acquires information on the superimposed region 30 which is an overlapping portion of the first projection range 10 and the second projection range 20. The information on the superimposed region 30 is information indicating a position of the superimposed region 30 in the first projection range 10 and a position of the superimposed region 30 in the second projection range 20.

The superimposed region information acquisition unit 42 images the screen 6 by the imaging unit 5 in a state in which a test image is projected from the first projection device 1 on the first projection range 10, and acquires the captured image. Further, the superimposed region information acquisition unit 42 images the screen 6 by the imaging unit 5 in a state in which the test image is projected from the second projection device 2 on the second projection range 20, and acquires the captured image. The superimposed region information acquisition unit 42 detects the test image from each of these two captured images, and acquires the information on the superimposed region 30 in a state in which two detected test images are overlapped.

Note that in a case in which the projection system 100 is a system in which the positions of the first projection device 1 and the second projection device 2 are fixed from the beginning, the information on the superimposed region 30 is predetermined at the time of manufacturing the system and is stored in a storage medium of the control device 4. Therefore, the superimposed region information acquisition unit 42 need only acquire the information on the superimposed region 30 from this storage medium. In this case, it is possible to omit the imaging unit 5. In a case in which the projection system 100 is a system in which the positions of the first projection device 1 and the second projection device 2 can be manually changed, the information on the superimposed region 30 can be acquired by projecting the test image as described above.

Further, the superimposed region information acquisition unit 42 may recognize the superimposed region 30 based on information on a distance between the first projection device 1 and the second projection device 2, information on an angle formed by a direction of an optical axis of the first projection device 1 and a direction of an optical axis of the second projection device 2, and the like. These pieces of information may be manually input to the control device 4, or may be automatically determined by the control device 4 by sensors and the like provided in the first projection device 1 and the second projection device 2.

Figure 4:
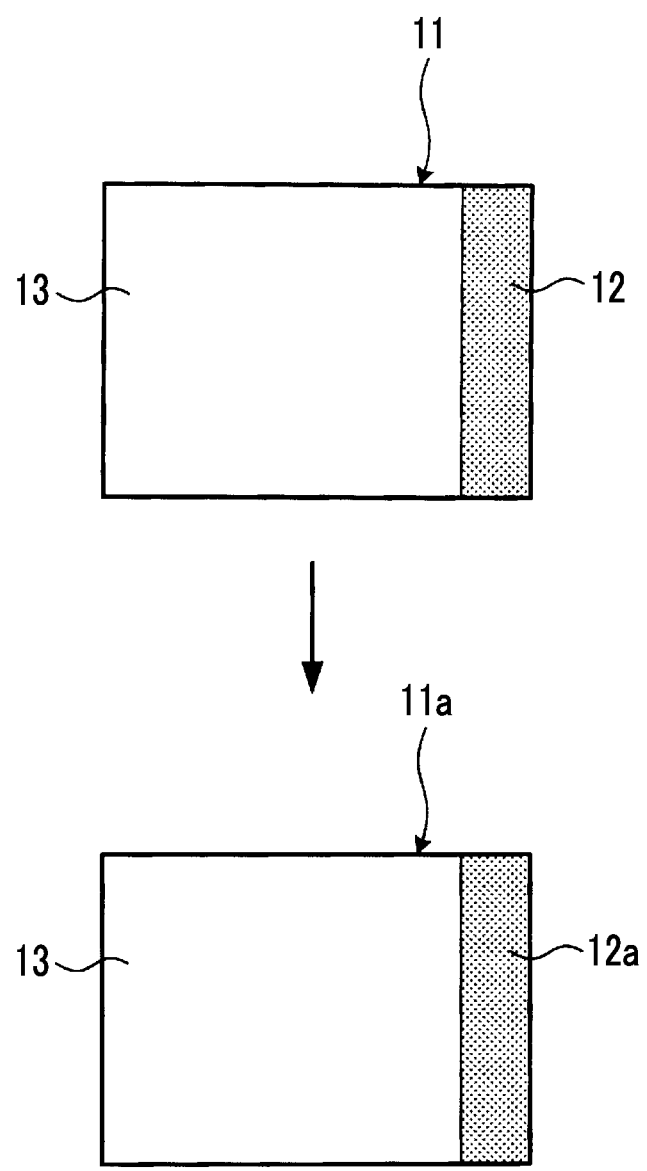
FIG. 4 is a schematic diagram for describing processing of a first image processing unit 43.

The first image processing unit 43 performs first image processing on the first portion in the first image data acquired by the image acquisition unit 41, which corresponds to the superimposed region 30. FIG. 4 is a schematic diagram for describing processing of the first image processing unit 43. FIG. 4 shows first image data 11 acquired by the image acquisition unit 41 and first image data 11a obtained by processing the first image data 11 by the first image processing unit 43.

The first image processing unit 43 recognizes a first portion 12 (portion projected on the superimposed region 30) in the first image data 11, which corresponds to the superimposed region 30, based on the information on the position of the superimposed region 30 in the first projection range 10 acquired by the superimposed region information acquisition unit 42. A portion other than the first portion 12 in the first image data 11 is a non-superimposed region 13. The first image processing unit 43 performs the first image processing on the first portion 12 in the first image data 11 to generate the first image data 11a including a first portion 12a after the first image processing and the non-superimposed region 13.

The first image processing is processing for decreasing a spatial frequency of the image than that of an original image, and is, for example, blurring processing. Specifically, the blurring processing refers to low-pass filter processing, averaging processing, contrast decreasing processing, and the like.

Figure 5:
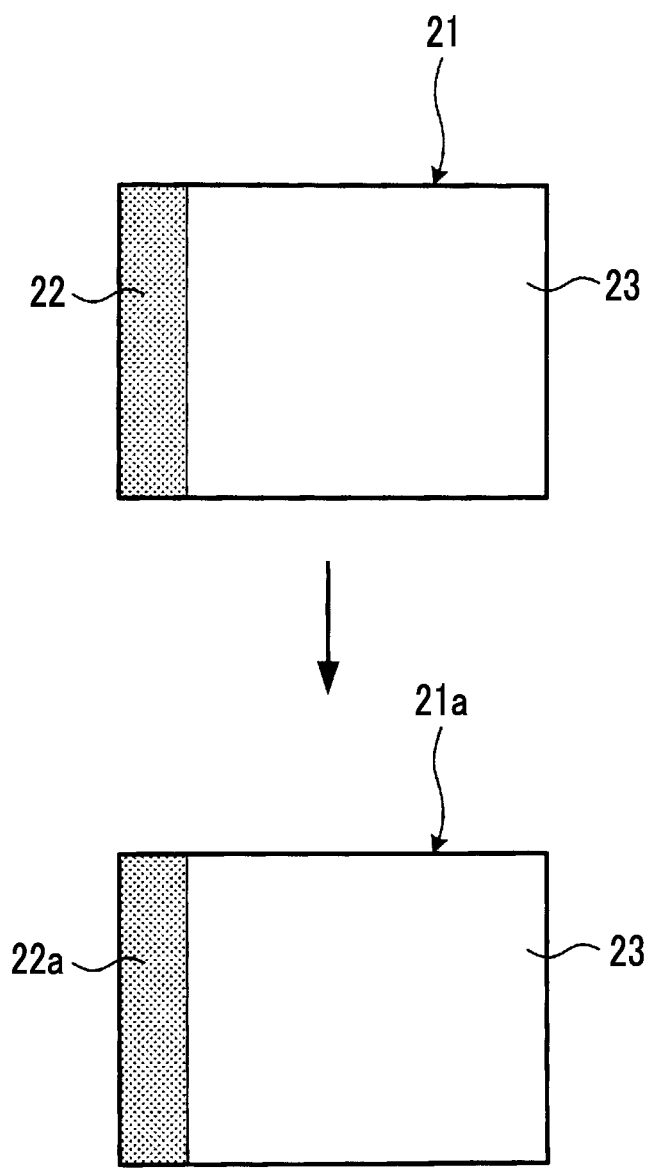
FIG. 5 is a schematic diagram for describing processing of a second image processing unit 44.

The second image processing unit 44 performs second image processing on the second portion in the second image data acquired by the image acquisition unit 41, which corresponds to the superimposed region 30. FIG. 5 is a schematic diagram for describing processing of the second image processing unit 44. FIG. 5 shows second image data 21 acquired by the image acquisition unit 41 and second image data 21a obtained by processing the second image data 21 by the second image processing unit 44.

The second image processing unit 44 recognizes a second portion 22 (portion projected on the superimposed region 30) in the second image data 21, which corresponds to the superimposed region 30, based on the information on the position of the superimposed region 30 in the second projection range 20 acquired by the superimposed region information acquisition unit 42. A portion other than the second portion 22 in the second image data 21 is a non-superimposed region 23. The second image processing unit 44 performs the second image processing on the second portion 22 in the second image data 21 to generate the second image data 21a including a second portion 22a after the second image processing and the non-superimposed region 23.

The second image processing is processing for increasing the spatial frequency of the image than that of the original image, and is, for example, contour emphasis processing. Specifically, the contour emphasis processing refers to contrast emphasis processing, high-pass filter processing, and the like.

Note that the first portion 12 in the first image data, which corresponds to the superimposed region 30, and the second portion 22 in the second image data, which corresponds to the superimposed region 30, are the same image data, respectively. Therefore, the first portion 12a after the first image processing of the first portion 12 and the second portion 22a after the second image processing of the second portion 22 have the same image data except for the spatial frequency.

The output unit 45 shown in FIG. 3 outputs the first image data 11a after the first image processing to the control unit 102 of the first projection device 1 as the image data for the projection unit 101 of the first projection device 1, and outputs the second image data 21a after the second image processing to the control unit 102 of the second projection device 2 as the image data for the projection unit 101 of the second projection device 2.

The control unit 102 of the first projection device 1, which receives the first image data 11a, projects the first division image based on the first image data 11a on the first projection range 10, and the control unit 102 of the second projection device 2, which receives the second image data 21a, projects the second division image based on the second image data 21a on the second projection range 20.

As a result, on the superimposed region 30 of the screen 6 shown in FIG. 1, the image having a low spatial frequency based on the first portion 12a subjected to the first image processing and the image having a high spatial frequency based on the second portion 22a subjected to the second image processing are superimposed and projected. As a result, the bleeding of the image occurring in the superimposed region 30 can be suppressed, and an image quality of the projection target image can be improved.

First Modification Example

Figure 6:
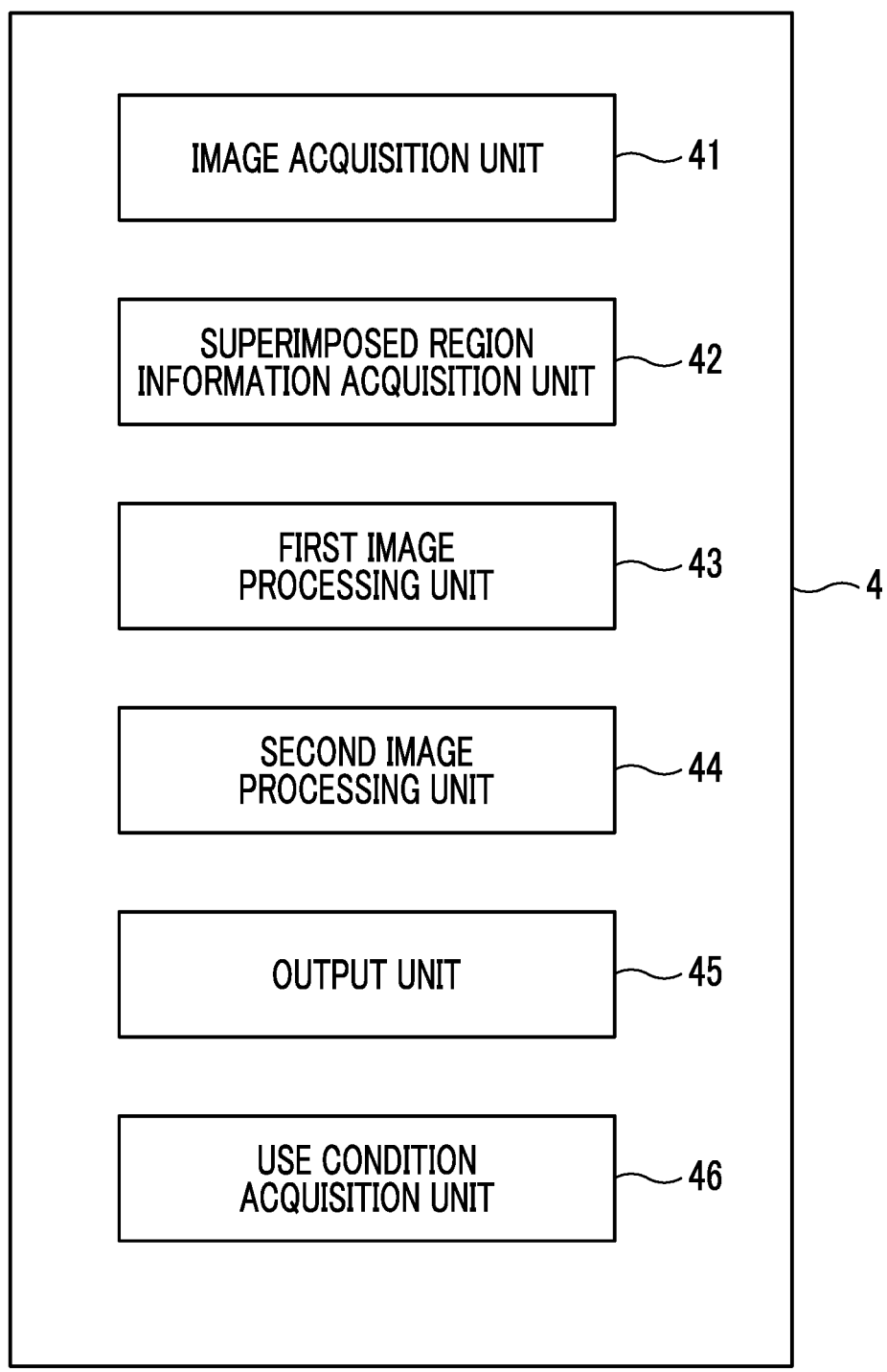
FIG. 6 is a functional block diagram showing a first modification example of the control device 4 shown in FIG. 3.

FIG. 6 is a functional block diagram showing a first modification example of the control device 4 shown in FIG. 3. In the following description, the same components as those described above will be designated by the common reference numerals, and the description thereof will be omitted as appropriate.

The control unit of the control device 4 shown in FIG. 6 executes a program including an image processing program to functions as the image processing device including the image acquisition unit 41, the superimposed region information acquisition unit 42, the first image processing unit 43, the second image processing unit 44, the output unit 45, and a use condition acquisition unit 46.

The use condition acquisition unit 46 acquires information on the use conditions of the projection unit 101 of the first projection device 1 and the projection unit 101 of the second projection device 2. The use conditions are a temperature inside each projection unit 101 of the first projection device 1 and the second projection device 2, and a state of the projection optical system 103 in each projection unit 101 of the first projection device 1 and the second projection device 2.

It is possible to acquire information on the temperature from a temperature sensor built in each projection unit 101 of the first projection device 1 and the second projection device 2. The state of the projection optical system 103 is a focal length in a case in which the projection optical system 103 includes a zoom lens, and is a focal position in a case in which the projection optical system 103 includes a focus lens. Further, the state of the projection optical system 103 may be an inclination of an optical axis of the projection optical system 103. The inclination of the optical axis of the projection optical system 103 is an angle formed by an installation surface of each of the first projection device 1 and the second projection device 2 and the optical axis of the projection optical system 103. It is possible to acquire information on the inclination of the optical axis of the projection optical system 103 from an acceleration sensor or the like mounted on each of the first projection device 1 and the second projection device 2.

Each of the first image processing unit 43 and the second image processing unit 44 of the first modification example controls a degree (intensity) of image processing based on the information on the use conditions acquired by the use condition acquisition unit 46.

Figure 7:
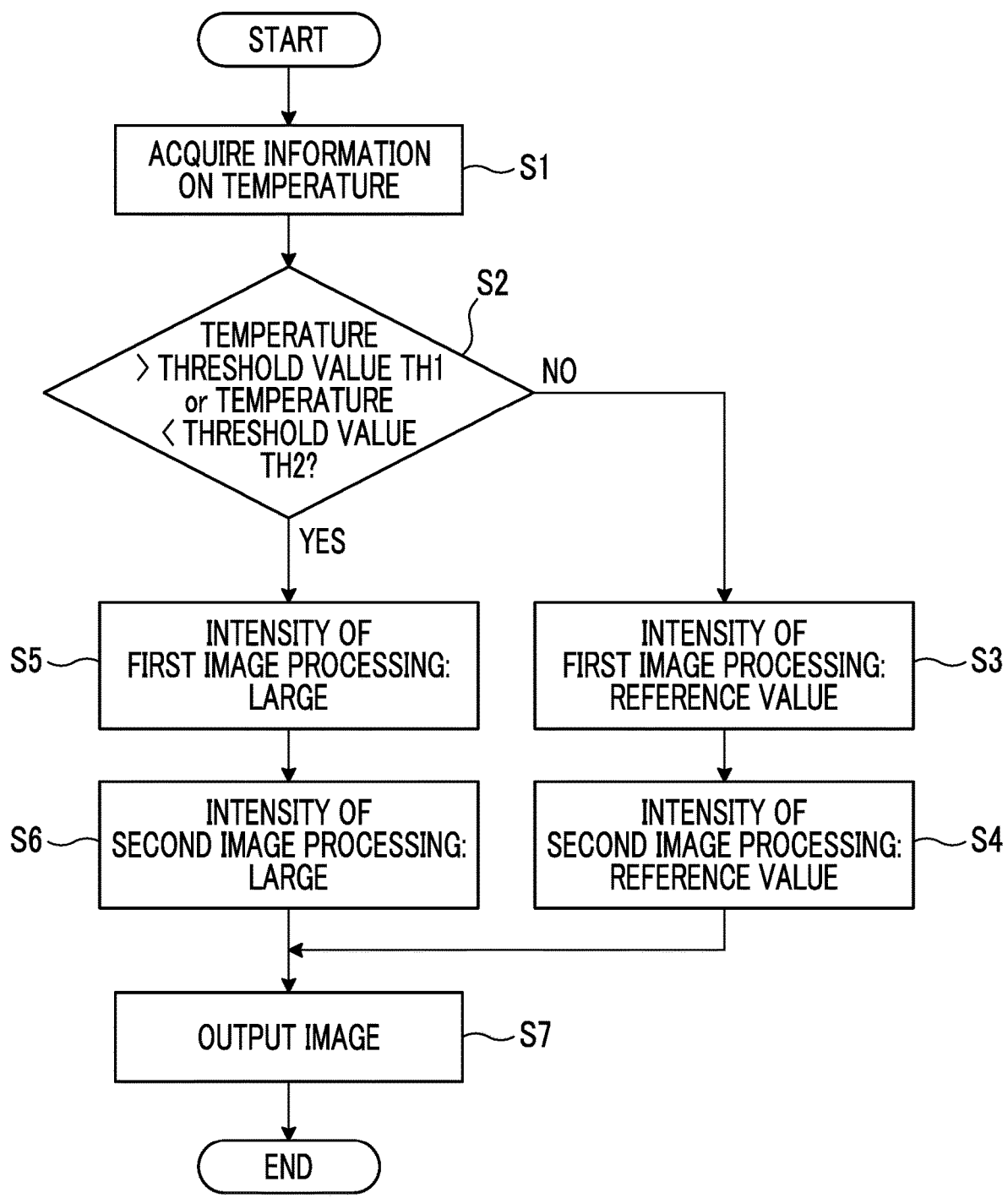
FIG. 7 is a flowchart for describing an operation of the control device 4 of the first modification example.

FIG. 7 is a flowchart for describing an operation of the control device 4 of the first modification example. The use condition acquisition unit 46 acquires the information on the temperature inside each projection unit 101, from each control unit 102 of the first projection device 1 and the second projection device 2 (step S1).

In a case in which the temperature acquired in step S1 is equal to or larger than a threshold value TH2 and equal to or less than a threshold value TH1 (step S2: NO), the first image processing unit 43 sets the intensity of the first image processing to a predetermined reference value B1 and performs the first image processing (step S3), and the second image processing unit 44 sets the intensity of the second image processing to a predetermined reference value B2 and performs the second image processing (step S4).

On the other hand, in a case in which the temperature acquired in step S1 exceeds the threshold value TH1 or is less than the threshold value TH2 (step S2: YES), the first image processing unit 43 sets the intensity of the first image processing to a value larger than the reference value B1 and performs the first image processing (step S5), and the second image processing unit 44 sets the intensity of the second image processing to a value larger than the reference value B2 and performs the second image processing (step S6).

After the image processing is performed in steps S3 to S6, the output unit 45 outputs the first image data to the first projection device 1 and outputs the second image data to the second projection device 2 (step S7), and the projection target image is displayed.

In a case in which the temperature inside the projection unit 101 is low, the contraction of the lens included in the projection optical system 103 may occur. Further, in a case in which the temperature inside the projection unit 101 is high, the expansion of the lens included in the projection optical system 103 may occur. In a case in which such contraction or expansion of the lens occurs, there is a possibility of the misregistration of the images in the superimposed region 30 being large. Therefore, in a case in which it is determined that the contraction or expansion occurs (step S2: YES) as in an operation example shown in FIG. 7, as compared with a case in which it is determined that the contraction or expansion does not occur (step S2: NO), the degrees of the first image processing and the second image processing are increased, so that the bleeding in the superimposed region 30 can be effectively suppressed.

Figure 8:
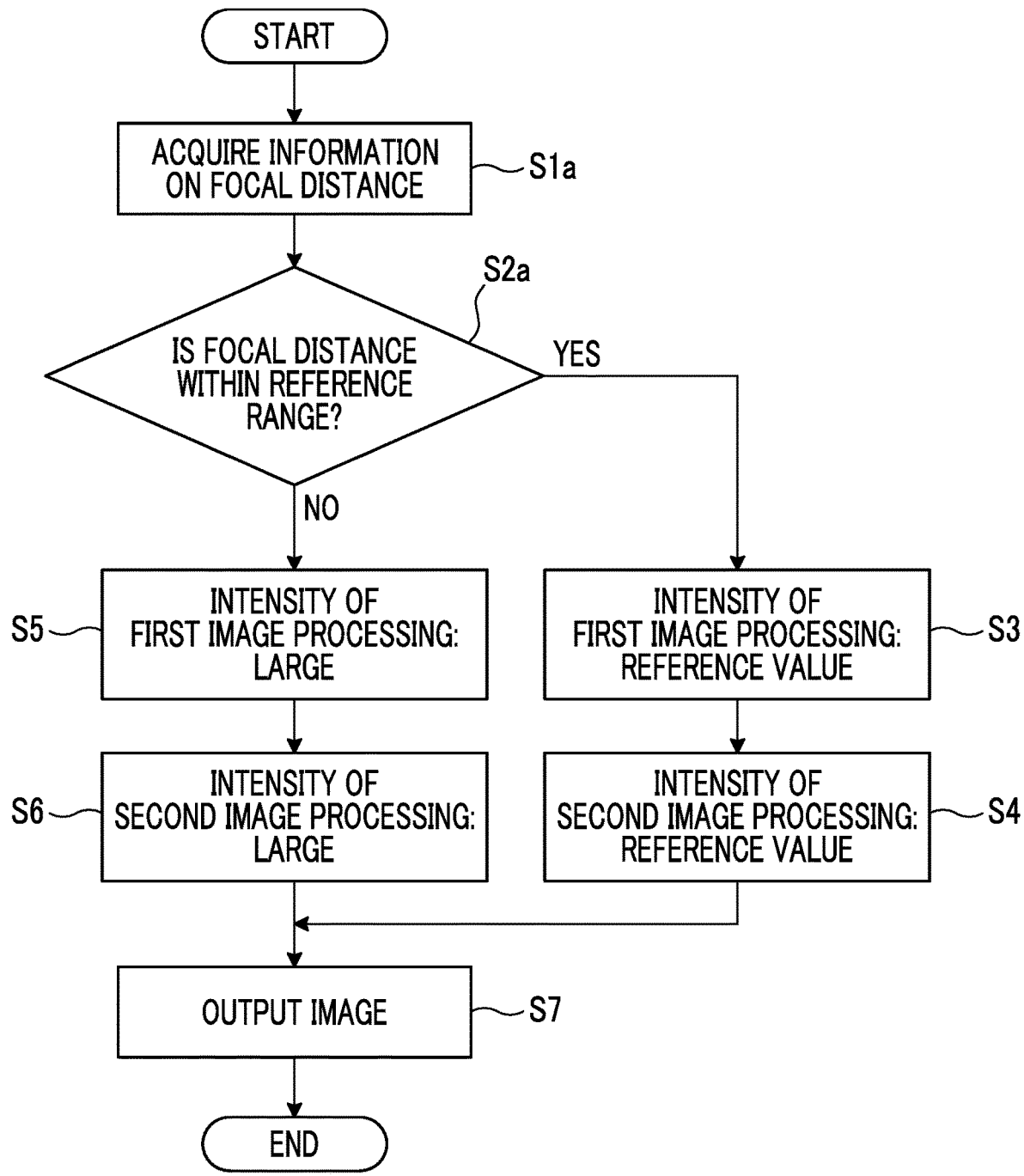
FIG. 8 is a flowchart for describing another operation of the control device 4 of the first modification example.

FIG. 8 is a flowchart for describing another operation of the control device 4 of the first modification example. In FIG. 8, the same process as in FIG. 7 is designated by the same reference numeral and the description thereof will be omitted.

The use condition acquisition unit 46 acquires information on the focal length of each projection optical system 103, from each control unit 102 of the first projection device 1 and the second projection device 2 (step S1a).

In a case in which the focal length acquired in step S1a is within a predetermined reference range of the focal length (step S2a: YES), the processes after step S3 are performed. On the other hand, in a case in which the focal length acquired in step S1a is outside the reference range described above (step S2a: NO), the processes after step S5 are performed.

In a case in which the focal length of the projection optical system 103 is too long or too short, there is a possibility of the misregistration of the two images in the superimposed region 30 being large. Therefore, in a case in which the focal length of the projection optical system 103 is outside the reference range (step S2a: NO) as in an operation example shown in FIG. 8, as compared with a case in which the focal length of the projection optical system 103 is within the reference range (step S2a: YES), the degrees of the first image processing and the second image processing are increased, so that the bleeding of the image in the superimposed region 30 can be effectively suppressed.

Note that the operation of FIG. 7 and the operation of FIG. 8 may be combined. For example, an operation may be adopted in which in a case in which the determination in step S2 of FIG. 7 is NO, the process is shifted to step S1a of FIG. 8. Alternatively, an operation may be adopted in which in a case in which the determination in step S2a of FIG. 8 is YES, the process is shifted to step S1 of FIG. 7.

Figure 9:
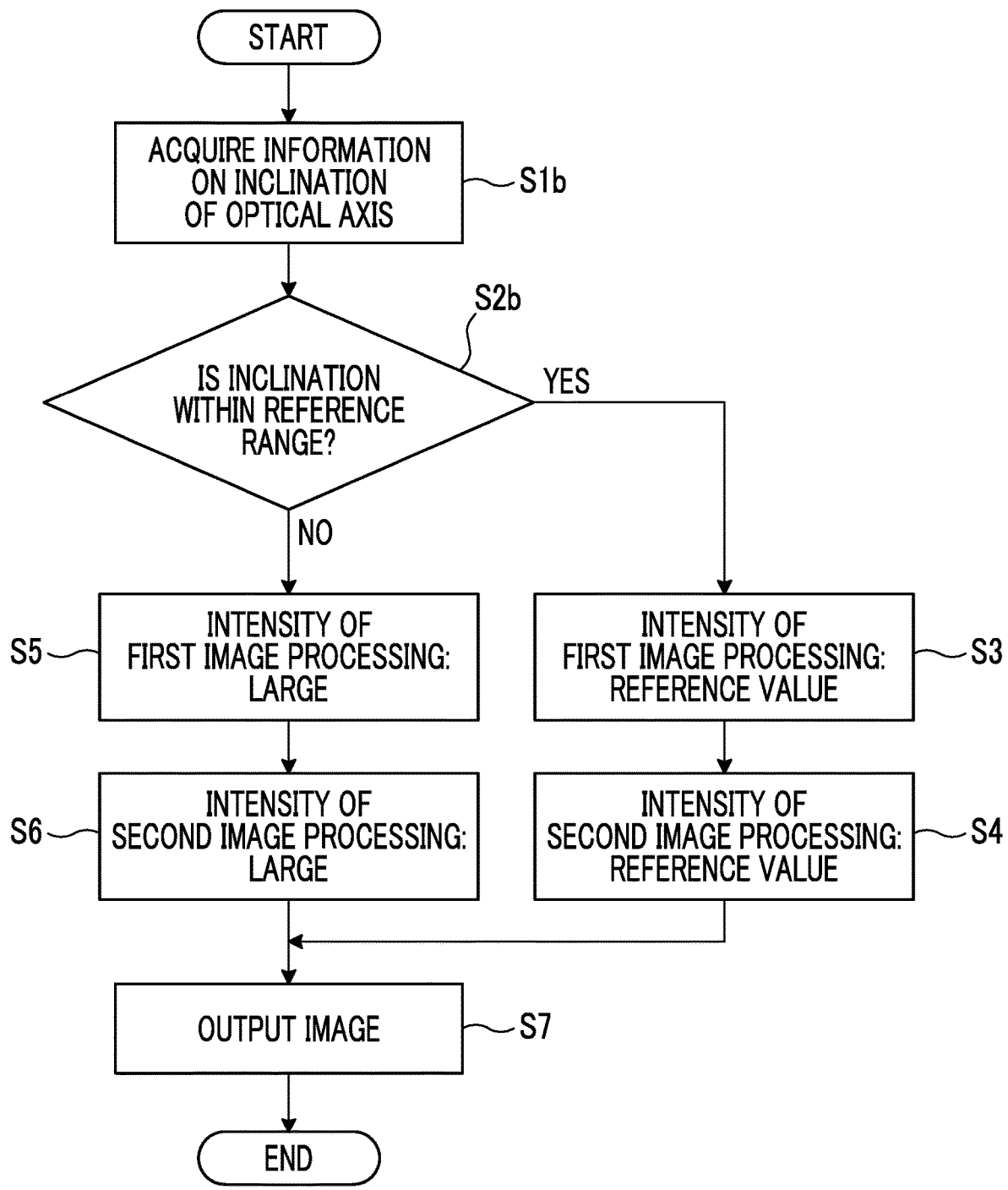
FIG. 9 is a flowchart for describing still another operation of the control device 4 of the first modification example.

FIG. 9 is a flowchart for describing still another operation of the control device 4 of the first modification example. In FIG. 9, the same process as in FIG. 7 is designated by the same reference numeral and the description thereof will be omitted.

The use condition acquisition unit 46 acquires the information on the inclination of the optical axis of each projection optical system 103, from each control unit 102 of the first projection device 1 and the second projection device 2 (step S1b).

In a case in which the inclination acquired in step S1b is within a predetermined reference range of the inclination of the optical axis (range of plus or minus α° centered on 0 degree) (step S2b: YES), the processes after step S3 are performed. On the other hand, in a case in which the inclination acquired in step S1b is outside the reference range described above (step S2b: NO), the processes after step S5 are performed.

In a case in which an absolute value of the inclination of the optical axis of the projection optical system 103 is large, there is a possibility of the misregistration of the two images in the superimposed region 30 being large due to a change in a posture of an optical member included in the projection optical system 103. Therefore, in a case in which the inclination of the optical axis of the projection optical system 103 is outside the reference range (step S2b: NO) as in an operation example shown in FIG. 9, as compared with a case in which the inclination of the optical axis of the projection optical system 103 is within the reference range (step S2b: YES), the degrees of the first image processing and the second image processing are increased, so that the bleeding of the image in the superimposed region 30 can be effectively suppressed.

Note that the operation of FIG. 7 and the operation of FIG. 9 may be combined. For example, an operation may be adopted in which in a case in which the determination in step S2 of FIG. 7 is NO, the process is shifted to step S1b of FIG. 9. Alternatively, an operation may be adopted in which in a case in which the determination in step S2b of FIG. 9 is YES, the process is shifted to step S1 of FIG. 7.

Second Modification Example

Figure 10:
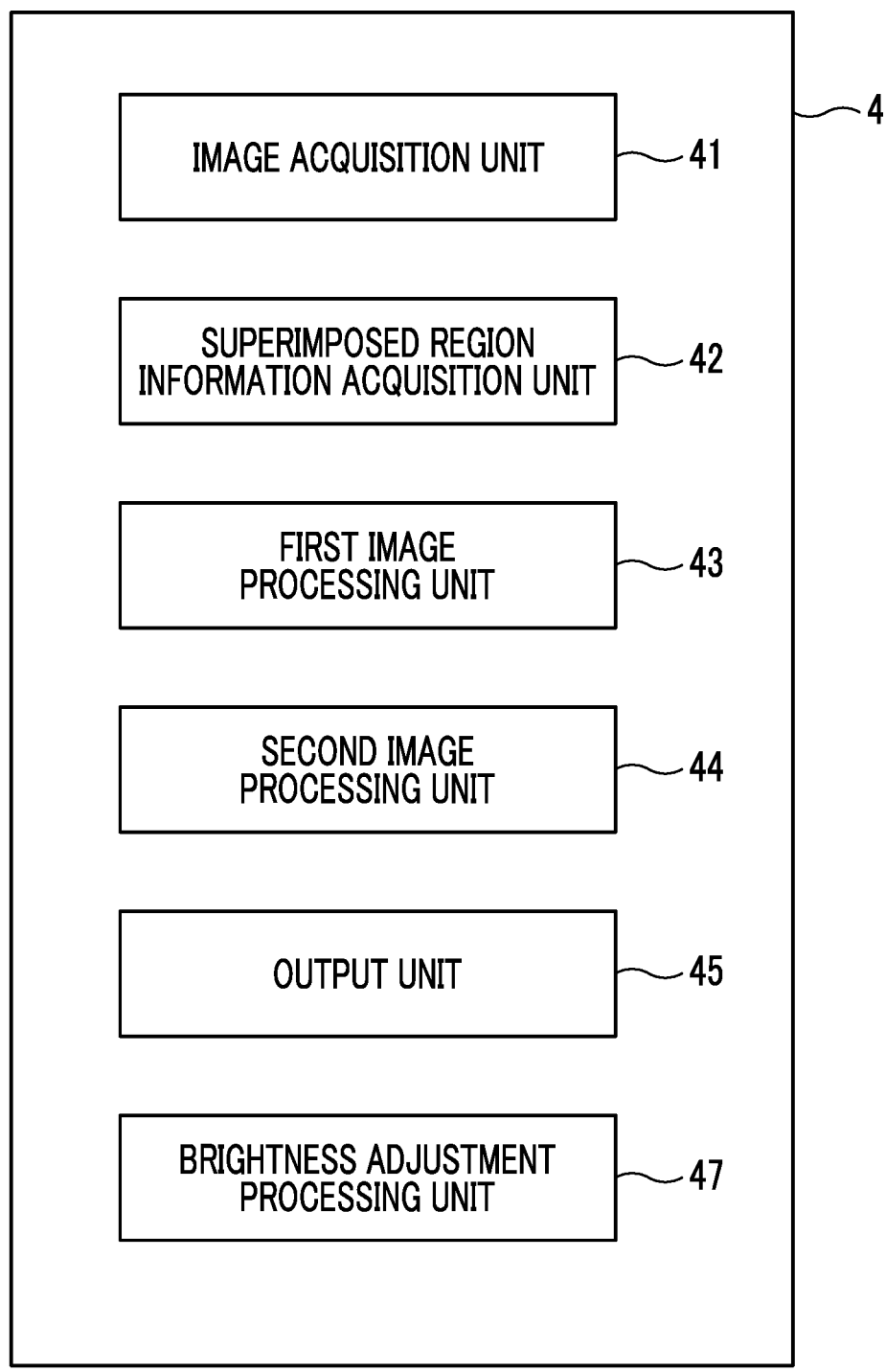
FIG. 10 is a functional block diagram showing a second modification example of the control device 4 shown in FIG. 3.

FIG. 10 is a functional block diagram showing a second modification example of the control device 4 shown in FIG. 3. In the following description, the same components as those described above will be designated by the common reference numerals, and the description thereof will be omitted as appropriate.

The control unit of the control device 4 shown in FIG. 10 executes a program including an image processing program to function as the image processing device including the image acquisition unit 41, the superimposed region information acquisition unit 42, the first image processing unit 43, the second image processing unit 44, the output unit 45, and a brightness adjustment processing unit 47.

In the second modification example, it is assumed that in a state in which the first projection range 10 and the second projection range 20 are completely overlapped, stated another way, in a state in which the size of the superimposed region 30 is the same as each of the first projection range 10 and the second projection range 20, a mode in which the image is projected on the screen 6 (referred to as a stack projection mode) and a mode in which the respective parts of the first projection range 10 and the second projection range 20 are overlapped as shown in FIG. 1 to project the horizontally long image (referred to as a panoramic projection mode) are provided in the projection system 100.

The brightness adjustment processing unit 47 performs brightness adjustment processing for allowing a total brightness of brightness of the first portion 12a in the first image data 11a shown in FIG. 4 (an average value or a median value of brightness values of all the pixels which constitute this portion) and brightness of the second portion 22a in the second image data 21a shown in FIG. 5 (an average value or a median value of brightness values of all the pixels which constitute this portion) to approach brightness of the non-superimposed region 13 in the first image data 11a (an average value or a median value of brightness values of all the pixels which constitute this portion) or brightness of the non-superimposed region 23 in the second image data 21a (an average value or a median value of brightness values of all the pixels which constitute this portion). The brightness adjustment processing unit 47 decides whether or not to perform the brightness adjustment processing based on the size of the superimposed region 30.

Figure 11:
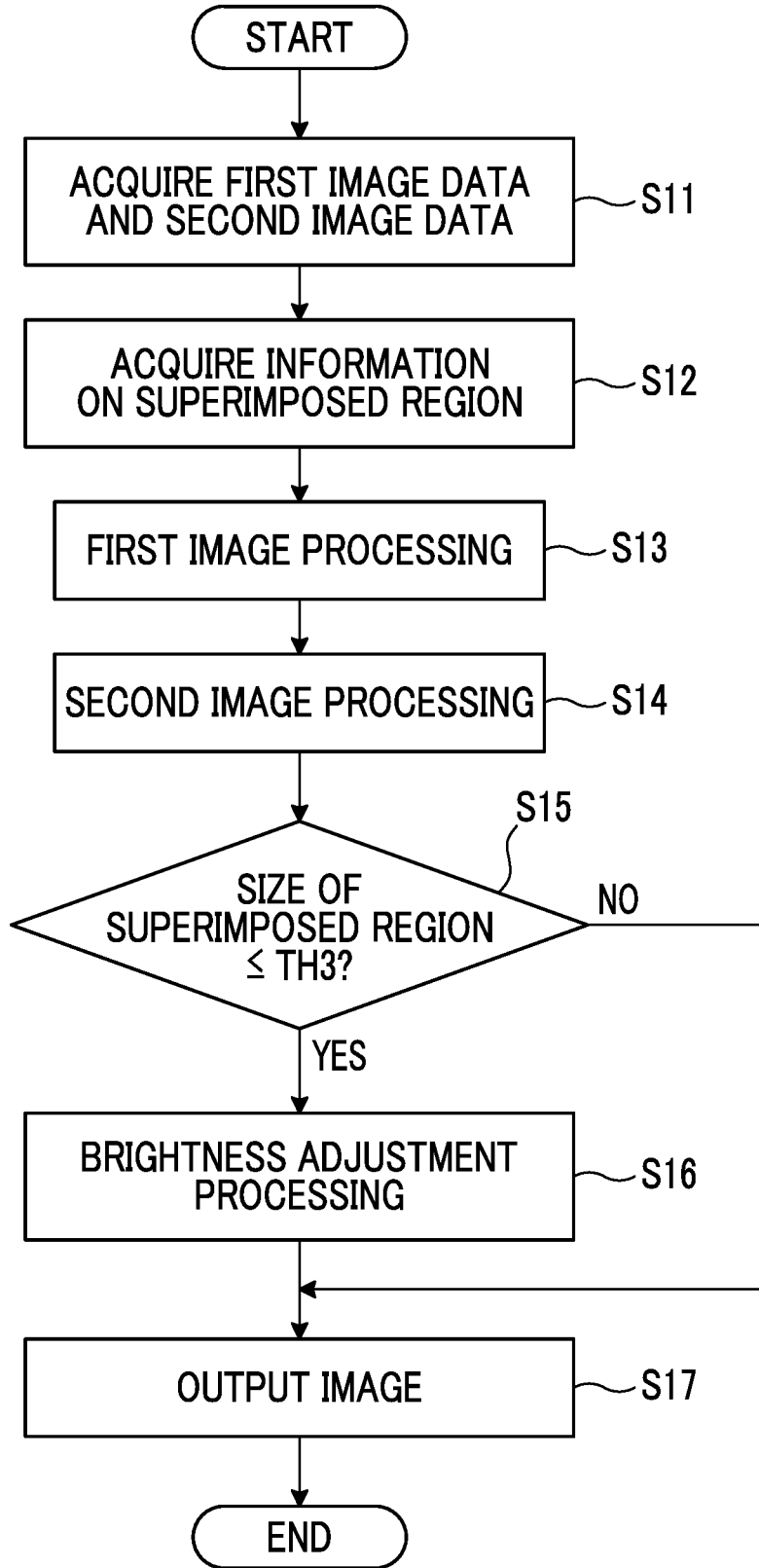
FIG. 11 is a flowchart for describing an operation of the control device 4 of the second modification example.

FIG. 11 is a flowchart for describing an operation of the control device 4 of the second modification example. The image acquisition unit 41 acquires the first image data and the second image data (step S11), and the superimposed region information acquisition unit 42 acquires the information on the superimposed region 30 (step S12).

Then, the first image processing unit 43 performs the first image processing on the first portion in the first image data (step S13). Subsequently, the second image processing unit 44 performs the second image processing on the second portion in the second image data (step S14).

Next, the brightness adjustment processing unit 47 determines whether or not the size of the superimposed region 30 (for example, an area or a width in a horizontal direction) is equal to or less than a threshold value TH3 (step S15). The brightness adjustment processing unit 47 does not perform the brightness adjustment processing in a case in which the size of the superimposed region 30 exceeds the threshold value TH3 (step S15: NO). The case in which the size of the superimposed region 30 exceeds the threshold value TH3 corresponds to a case in which the stack projection mode described above is selected. That is, in a case in which the determination in step S15 is NO, it is a state in which the first image processing is performed to the entire first image data and the second image processing is performed to the entire second image data.

In a case in which the size of the superimposed region 30 is equal to or less than the threshold value TH3 (step S15: YES), the brightness adjustment processing unit 47 calculates the total value of the brightness of the first portion in the first image data after the processing in step S13 and the brightness of the second portion in the second image data after the processing in step S14, and performs adjustment of the brightness of each of the non-superimposed region of the first image data and the non-superimposed region of the second image data such that the total value, the brightness of the non-superimposed region of the first image data after the processing in step S13, and the brightness of the non-superimposed region of the second image data after the processing in step S14 are matched with each other (step S16). The case in which the size of the superimposed region 30 is equal to or less than the threshold value TH3 corresponds to a case in which the panoramic projection mode described above is selected.

In a case in which the determination in step S15 is NO, and after step S16, the output unit 45 outputs the first image data generated so far to the control unit 102 of the first projection device 1, and outputs the second image data generated so far to the control unit 102 of the second projection device 2.

According to the second modification example described above, in the case in which the panoramic projection mode is selected, the brightness of the image projected on the range other than the superimposed region 30 in the first projection range 10, the brightness of the image projected on the range other than the superimposed region 30 in the second projection range 20, and the brightness of the image projected on the superimposed region 30 can be matched to each other, and the image quality in a case in which the image is displayed on the large screen can be improved. On the other hand, in the case in which the stack projection mode is selected, the process of step S16 is omitted, and thus the process load of the control device 4 can be reduced. In the stack projection mode, the image based on the first image data that is entirely subjected to the first image processing and the image based on the second image data that is entirely subjected to the second image processing are superimposed and projected on the screen 6. Therefore, it is possible to suppress the bleeding of the projected image.

The description has been made so far in which the projection system 100 includes two projection devices, but the control device 4 may be connected to three or more projection devices to control the projection devices. Even in this case, the bleeding of the superimposed region 30 in the projection target image on the large screen can be suppressed.

In addition, in the projection system 100, the imaging unit 5 is provided independently, but the imaging unit 5 may be built in the first projection device 1 and the second projection device 2. A configuration may be adopted in which all of the first projection device 1, the second projection device 2, the imaging unit 5, and the control device 4 are built in the same housing.

At least the following matters are described in the present specification. Note that the components and the like corresponding to those in the embodiment described above are shown in parentheses, but the present invention is not limited thereto.

(1)

An image processing device (control device 4) for a projection system (projection system 100) that projects an image from each of a first projection unit (projection unit 101 of the first projection device 1) and a second projection unit (projection unit 101 of the second projection device 2) in a state in which at least parts of projection ranges are overlapped, the device comprising an image acquisition unit (image acquisition unit 41) that acquires first image data (first image data 11) for projecting the image from the first projection unit and second image data (second image data 21) for projecting the image from the second projection unit, a superimposed region information acquisition unit (superimposed region information acquisition unit 42) that acquires information on a superimposed region (superimposed region 30) between the projection range (first projection range 10) of the first projection unit and the projection range (second projection range 20) of the second projection unit, a first image processing unit (first image processing unit 43) that performs first image processing on a first portion (first portion 12) in the first image data, which corresponds to the superimposed region, a second image processing unit (second image processing unit 44) that performs second image processing on a second portion (second portion 22) in the second image data, which corresponds to the superimposed region, and an output unit that outputs the first image data (first image data 11a) after the first image processing as image data for the first projection unit, and outputs the second image data (second image data 21a) after the second image processing as image data for the second projection unit.

(2)

The image processing device according to (1), in which spatial frequencies of image data to be processed are made different between the first image processing and the second image processing.

(3)

The image processing device according to (1) or (2), further comprising a use condition acquisition unit (use condition acquisition unit 46) that acquires information on use conditions of the first projection unit and the second projection unit, in which the first image processing unit controls a degree of the first image processing based on the use condition, and the second image processing unit controls a degree of the second image processing based on the use condition.

(4)

The image processing device according to (3), in which the use conditions are temperatures of the first projection unit and the second projection unit.

(5)

The image processing device according to (3) or (4), in which the use conditions are states of optical systems of the first projection unit and the second projection unit.

(6)

The image processing device according to any one of (1) to (5), further comprising a brightness adjustment processing unit (brightness adjustment processing unit 47) that performs brightness adjustment processing for allowing total brightness of brightness of the first portion and brightness of the second portion to approach brightness of a portion (non-superimposed region 13) other than the first portion in the first image data or brightness of a portion (non-superimposed region 23) other than the second portion in the second image data, in which the brightness adjustment processing unit decides whether or not to perform the brightness adjustment processing based on a size of the superimposed region.

(7)

The image processing device according to (6), in which the brightness adjustment processing unit performs the brightness adjustment processing in a case in which the size of the superimposed region is equal to or less than a threshold value.

(8)

The image processing device according to any one of (1) to (7), in which the first image processing is blurring processing, and the second image processing is contour emphasis processing.

(9)

A projection system comprising the image processing device according to any one of (1) to (8), the first projection unit, and the second projection unit.

(10)

An image processing method in a projection system that projects an image from each of a first projection unit and a second projection unit in a state in which at least parts of projection ranges are overlapped, the method comprising an image acquisition step of acquiring first image data for projecting the image from the first projection unit and second image data for projecting the image from the second projection unit, a superimposed region information acquisition step of acquiring information on a superimposed region between the projection range of the first projection unit and the projection range of the second projection unit, a first image processing step of performing first image processing on a first portion in the first image data, which corresponds to the superimposed region, a second image processing step of performing second image processing on a second portion in the second image data, which corresponds to the superimposed region, and an output step of outputting the first image data after the first image processing as image data for the first projection unit and outputting the second image data after the second image processing as image data for the second projection unit.

(11)

The image processing method according to (10), in which spatial frequencies of an image to be processed are made different between the first image processing and the second image processing.

(12)

The image processing method according to (10) or (11), further comprising a use condition acquisition step of acquiring information on use conditions of the first projection unit and the second projection unit, in which in the first image processing step, a degree of the first image processing is controlled based on the use condition, and in the second image processing step, a degree of the second image processing is controlled based on the use condition.

(13)

The image processing method according to (12), in which the use conditions are temperatures of the first projection unit and the second projection unit.

(14)

The image processing method according to (12) or (13), in which the use conditions are states of optical systems of the first projection unit and the second projection unit.

(15)

The image processing method according to any one of (10) to (14), further comprising a brightness adjustment processing step of performing brightness adjustment processing for allowing total brightness of brightness of the first portion and brightness of the second portion to approach brightness of a portion other than the first portion in the first image data or brightness of a portion other than the second portion in the second image data, in which in the brightness adjustment processing step, it is decided as to whether or not to perform the brightness adjustment processing based on a size of the superimposed region.

(16)

The image processing method according to (15), in which in the brightness adjustment processing step, the brightness adjustment processing is performed in a case in which the size of the superimposed region is equal to or less than a threshold value.

(17)

The image processing method according to any one of (10) to (16), in which the first image processing is blurring processing, and the second image processing is contour emphasis processing.

(18)

An image processing program in a projection system that projects an image from each of a first projection unit and a second projection unit in a state in which at least parts of projection ranges are overlapped, the program causing a computer to execute an image acquisition step of acquiring first image data for projecting the image from the first projection unit and acquiring second image data for projecting the image from the second projection unit, a superimposed region information acquisition step of acquiring information on a superimposed region between the projection range of the first projection unit and the projection range of the second projection unit, a first image processing step of performing first image processing on a first portion in the first image data, which corresponds to the superimposed region, a second image processing step of performing second image processing on a second portion in the second image data, which corresponds to the superimposed region, and an output step of outputting the first image data after the first image processing as image data for the first projection unit and outputting the second image data after the second image processing as image data for the second projection unit.

Various embodiments have been described above with reference to the drawings, but it is needless to say that the present invention is not limited thereto. It is obvious that those skilled in the art can conceive various changes or modifications within the scope described in the claims, and naturally, such changes or modifications also belong to the technical scope of the present invention. Further, the components in the embodiments described above may be optionally combined without departing from the spirit of the invention.

Note that the present application is based on a Japanese patent application filed on Mar. 29, 2019 (JP2019-068601), the contents of which are incorporated herein by reference.

According to the present invention, in a case in which parts of the plurality of images are overlapped and projected, the bleeding of the overlapping portion can be suppressed and the image quality can be improved, which is effective for displaying the image on the large screen.

EXPLANATION OF REFERENCES

100: projection system
1: first projection device
101: projection unit
102: control unit
103: projection optical system
104: display unit
104a: light source
104b: optical modulation unit
2: second projection device
4: control device
41: image acquisition unit
42: superimposed region information acquisition unit
43: first image processing unit
44: second image processing unit
45: output unit
46: use condition acquisition unit
47: brightness adjustment processing unit
11, 11a: first image data
12, 12a: first portion
13: non-superimposed region
21, 21a: second image data
22, 22a: second portion
23: non-superimposed region
5: imaging unit 6: screen
10: first projection range
20: second projection range
30: superimposed region

What is claimed is:

1. An image processing device for a projection system that projects an image from each of a first projection unit and a second projection unit in a state in which at least parts of projection ranges of the first and second projection units are overlapped, the device comprising:
   an image acquisition unit that acquires first image data for projecting the image from the first projection unit and second image data for projecting the image from the second projection unit;
   a superimposed region information acquisition unit that acquires information on a superimposed region between the projection range of the first projection unit and the projection range of the second projection unit;
   an image processing unit that performs first image processing that makes a spatial frequency of a first portion, which corresponds to the superimposed region, in the first image data, to be a different spatial frequency from a spatial frequency of an entire part of the first image data; and performs second image processing that makes a spatial frequency of a second portion, which corresponds to the superimposed region, in the second image data, to be a different spatial frequency from a spatial frequency of an entire part of the second image data; and
   an output unit that outputs the first image data after the first image processing as image data for the first projection unit and outputs the second image data after the second image processing as image data for the second projection unit.

2. The image processing device according to claim 1, further comprising:
   a use condition acquisition unit that acquires information on use conditions of the first projection unit and the second projection unit,
   wherein the image processing unit controls a degree of the first image processing based on the use condition, and
   the image processing unit controls a degree of the second image processing based on the use condition.

3. The image processing device according to claim 2, wherein the use conditions are temperatures of the first projection unit and the second projection unit.

4. The image processing device according to claim 2, wherein the use conditions are states of optical systems of the first projection unit and the second projection unit.

5. The image processing device according to claim 1, further comprising:
   a brightness adjustment processing unit that performs brightness adjustment processing for allowing total brightness of brightness of the first portion and brightness of the second portion to approach brightness of a portion other than the first portion in the first image data or brightness of a portion other than the second portion in the second image data,
   wherein the brightness adjustment processing unit decides whether or not to perform the brightness adjustment processing based on a size of the superimposed region.

6. The image processing device according to claim 5, wherein the brightness adjustment processing unit performs the brightness adjustment processing in a case in which the size of the superimposed region is equal to or less than a threshold value.

7. The image processing device according to claim 1, wherein the first image processing is blurring processing, and
   the second image processing is contour emphasis processing.

8. A projection system comprising:
   the image processing device according to claim 1;
   the first projection unit; and
   the second projection unit.

9. An image processing method in a projection system that projects an image from each of a first projection unit and a second projection unit in a state in which at least parts of projection ranges of the first and second projection units are overlapped, the method comprising:
   an image acquisition step of acquiring first image data for projecting the image from the first projection unit and second image data for projecting the image from the second projection unit;
   a superimposed region information acquisition step of acquiring information on a superimposed region between the projection range of the first projection unit and the projection range of the second projection unit;
   an image processing step of performing first image processing that makes a spatial frequency of a first portion, which corresponds to the superimposed region, in the first image data, to be a different spatial frequency from a spatial frequency of an entire part of the first image data, and performing second image processing that makes a spatial frequency of a second portion, which corresponds to the superimposed region, in the second image data, to be a different spatial frequency from a spatial frequency of an entire part of the second image data; and
   an output step of outputting the first image data after the first image processing as image data for the first projection unit and outputting the second image data after the second image processing as image data for the second projection unit.

10. The image processing method according to claim 9, further comprising:
    a use condition acquisition step of acquiring information on use conditions of the first projection unit and the second projection unit,
    wherein in the image processing step, a degree of the first image processing is controlled based on the use condition, and
    in the image processing step, a degree of the second image processing is controlled based on the use condition.

11. The image processing method according to claim 10, wherein the use conditions are temperatures of the first projection unit and the second projection unit.

12. The image processing method according to claim 10, wherein the use conditions are states of optical systems of the first projection unit and the second projection unit.

13. The image processing method according to claim 9, further comprising:
    a brightness adjustment processing step of performing brightness adjustment processing for allowing total brightness of brightness of the first portion and brightness of the second portion to approach brightness of a portion other than the first portion in the first image data or brightness of a portion other than the second portion in the second image data,
    wherein in the brightness adjustment processing step, it is decided as to whether or not to perform the brightness adjustment processing based on a size of the superimposed region.

14. The image processing method according to claim 13, wherein in the brightness adjustment processing step, the brightness adjustment processing is performed in a case in which the size of the superimposed region is equal to or less than a threshold value.

15. The image processing method according to claim 9, wherein the first image processing is blurring processing, and the second image processing is contour emphasis processing.

16. A non-transitory computer readable medium storing an image processing program in a projection system that projects an image from each of a first projection unit and a second projection unit in a state in which at least parts of projection ranges of the first and second projection units are overlapped, the program causing a computer to execute:

an image acquisition step of acquiring first image data for projecting the image from the first projection unit and acquiring second image data for projecting the image from the second projection unit;

a superimposed region information acquisition step of acquiring information on a superimposed region between the projection range of the first projection unit and the projection range of the second projection unit;

an image processing step of performing first image processing that makes a spatial frequency of a first portion, which corresponds to the superimposed region, in the first image data; to be a different spatial frequency from a spatial frequency of an entire part of the first image data, and performing second image processing that makes a spatial frequency of a second portion, which corresponds to the superimposed region, in the second image data, to be a different spatial frequency from a spatial frequency of an entire part of the second image data; and an output step of outputting the first image data after the first image processing as image data for the first projection unit and outputting the second image data after the second image processing as image data for the second projection unit.

* * * * *